United States Patent [19]

Ito et al.

[11] Patent Number: 4,614,135
[45] Date of Patent: Sep. 30, 1986

[54] STRIPPING DEVICE FOR STRIPPING COATED WIRE

[75] Inventors: Takeji Ito; Saburo Kusumi; Kazuo Nishikawa, all of Komaki; Michio Fukuda; Toshifumi Okunishi, both of Osaka; Sinkichi Miwa; Yosinobu Ohta, both of Yokkaichi, all of Japan

[73] Assignees: CKD Corporation; Sumitomo Electric; Tokai Electric Wire Company Limited, all of Japan

[21] Appl. No.: 626,632

[22] Filed: Jul. 2, 1984

[30] Foreign Application Priority Data

Jul. 8, 1983 [JP] Japan ................................. 58-125120

[51] Int. Cl.⁴ ............................................. H02G 1/12
[52] U.S. Cl. ....................................... 81/9.51; 81/9.41
[58] Field of Search ............... 81/9.5 R, 9.5 A, 9.5 C, 81/9.51, 9.4, 9.41, 9.42, 9.43

[56] References Cited

U.S. PATENT DOCUMENTS 1,666,277 4/1928 White .................................. 81/9.51
2,422,776 6/1947 Cummy et al. ..................... 81/9.51
3,139,778 7/1964 Bielinski et al. ............... 81/9.5 A X

*Primary Examiner*—Frederick R. Schmidt
*Assistant Examiner*—Debra S. Meislin
*Attorney, Agent, or Firm*—Harness, Dickey & Pierce

[57] ABSTRACT

A stripping apparatus for stripping coated electric wires b has a pair of clamping plates movable into and out of contact with each other and provided with cutting edges formed at a constant pitch in their opposing contactable edges. The corresponding cutting edges in both clamping plates cooperate with each other in defining, when the clamping plates are held in contact with each other, cutting gaps of different sizes. The clamping plates are adapted to clamp and sever, at their cutting edges, the end portion of the coating d on the coated electric wire at least partially. Means are provided for causing a relative movement between the coated electric wire and the clamping plates thereby to remove the severed end portion of the coating from the core wire of the coated electric wire. The clamping plates are adapted to be moved also in the direction substantially perpendicular to the coated electric wire to bring to the cutting position one of the cutting gaps having the size corresponding to the diameter of the coated electric wire to be stripped. This stripping apparatus can cope with the demand for stripping of coated electric wires of various different diameters. A pair of resilient plates are attached to the rear surfaces of the clamping plates and overlie the cutting gaps for ejecting the severed end portions of the coating therefrom upon movement of the clamping plates away from each other from their cutting position.

7 Claims, 4 Drawing Figures

STRIPPING DEVICE FOR STRIPPING COATED WIRE

BACKGROUND OF THE INVENTION

The present invention relates to a stripping apparatus for stripping a coated electric wire having a core electric wire coated with an insulating coating made of a soft synthetic resin or a similar material. More particularly, the invention is concerned with a stripping apparatus for removing the insulating coating at the terminal end or an intermediate portion of the coated electric wire. Still more particularly, the invention is concerned with a stripping apparatus having a large adaptability to coated electric wires of various diameters.

Generally, a conventional stripping apparatus for stripping a coated electric wire has a pair of clamping plates having cutting edges which oppose each other leaving a predetermined gap therebetween when these clamping plates are held in contact with each other. The clamping plates are carried by a pair of arms movable so as to bring the clamping plates into and out of contact with each other. In operation, the coated electric wire to be stripped is clamped by the plates and received in the gap formed between the cutting edges of the plates so that the coating is cut by the cutting edges and removed from the core electric wire as a result of a relative movement between the core electric wire and the insulating coating. Since the size of the gap formed between the cutting edges of the clamping plates is fixed, it is necessary to prepare a plurality of pairs of clamping plates having different gap sizes and to selectively use one of these pairs of plates in order to meet the requirements for stripping coated electric wires of a large variety of diameters. In general, it takes an impractically long time for the clamping plates to be mounted on and demounted from the arms of the stripping apparatus. This conventional stripping apparatus, therefore, cannot be used suitably due to an extremely low working efficiency, particularly in the electric wire stripping in large-lot and small-quantity fashion.

SUMMARY OF THE INVENTION

Accordingly, it is a primary object of the invention to provide a stripping apparatus for stripping coated electric wires, having a plurality of pairs of cutting edges designed for various diameters of coated electric wires so that the cutting edges are selectively used for stripping coated electric wires of different diameters which are successively brought to the stripping position.

To this end, according to the invention, there is provided a stripping apparatus for stripping coated electric wires comprising: a pair of clamping plates movable into and out of contact with each other and provided with cutting edges formed at a constant pitch in their opposing contactable edges, the corresponding cutting edges in both clamping plates cooperating with each other in defining, when the clamping plates are held in contact with each other, cutting gaps of different sizes, the clamping plates being adapted to clamp and sever, at their cutting edges, the end portion of the coating on the coated electric wire at least partially; means for causing a relative movement between the coated electric wire and the clamping plates thereby to remove the severed end portion of the coating from the core wire of the coated electric wire; and means for shifting the clamping plates in the direction substantially perpendicular to the coated electric wire to bring to the cutting position one of the cutting gaps having the size corresponding to the diameter of the coated electric wire to be stripped.

The above and other objects, features and advantages of the invention will become clear from the following description of the preferred embodiment when the same is read in conjunction with the accompanying drawings.

BRIEF DESCRIPTION OF THE DRAWINGS

The accompanying drawings show a preferred embodiment of the invention in which.

DESCRIPTION OF THE PREFERRED EMBODIMENT

Figure 3:
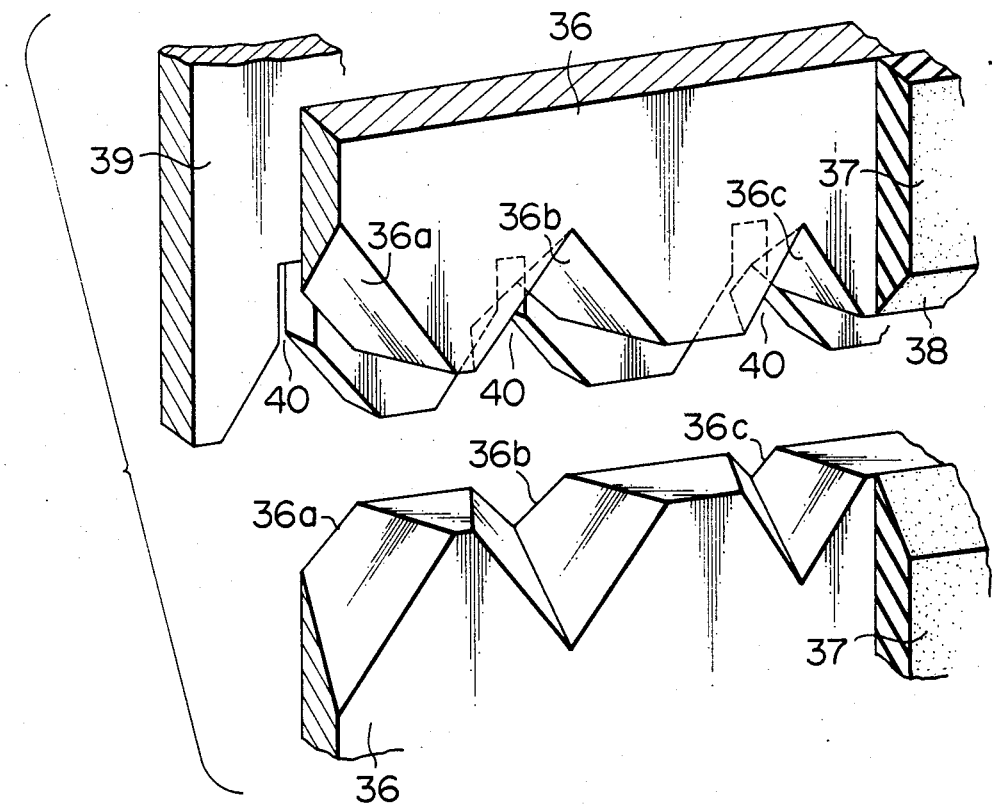
FIG. 3 is an enlarged perspective view of clamping plates.
Figure 4:
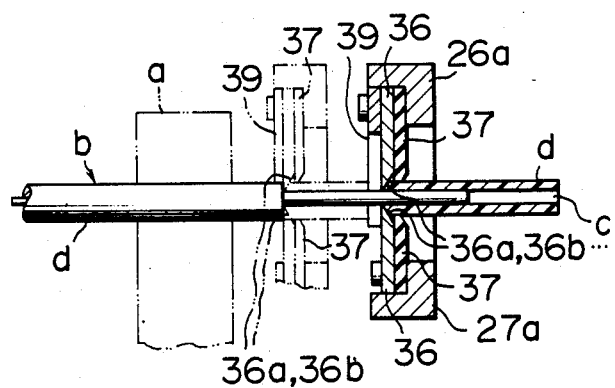
FIG. 4 is a sectional view of the clamping jaw.

Referring to the drawings, a preferred embodiment of the stripping apparatus of the invention for stripping coating wires has a base 1 provided with front and rear walls 1a and 1b which carry two parallel guide bars 2,2. A carriage 3 is movably carried by these guide bars 2,2. A first pneumatic cylinder 5 is fixed horizontally to a bracket 4 projected from the rear wall 1b of the base 1. A piston rod 6 is received by the pneumatic cylinder 5 so as to be extended forwardly therefrom. The end of the piston rod 6 remote from the pneumatic cylinder 5 is connected to the rear end of the carriage 3. A horizontal rotary shaft 9 is carried by the front wall 1a of the base 1 and a bracket 7 standing upright from the bottom of the base 1 and is placed below the guide bars 2,2. The rotary shaft 9 is adapted to be driven by a first pulse motor 8 attached to the bracket 7. An end-face cam 10 and the timing disk 11 are fixed to the rotary shaft 9. A roller 12 supported by the lower front end of the carriage 3 and directed downwardly is adapted to contact the cam surface of the end surface cam 10. A sensor 13 adapted to cooperate with the timing disk 11 is fixed to the base 1. Running guides 14,14 perpendicular to the guide bars 2,2 are formed on the upper surface of the carriage 3. A traverser 15 is movably carried by the running guides 14,14. A feed screw 17 is carried rotatably but not axially movably by a bearing 16 projected from one side of the carriage 3. The feed screw 17 is screwed to the traverser 15. A timing belt 21 is stretched between the output shaft of a pulse motor 19 secured to the rear upper surface of the carriage 3 and a pulley 18 fixed to the feed screw 17. A pair of supporting brackets 24,24 are fixed to the front upper side of the traverser 15 so as to extend forwardly therefrom. Upper and a lower T-shaped arms 26 and 27 are secured through pins 25,25 to the opposing end surfaces of the supporting brackets 24,24 for rocking motion in the vertical plane. A tunnel-shaped guide member 22 is fixed to the portion of the upper surface of the traverser 15 between the supporting brackets 24,24. An elongated actuator 23 is received by the tunnel-like guide member 22 for free forward and backward sliding motion. The end of the elongated actuator 23 has tapered upper and lower surfaces 28,28. Tension springs 30,30 secured to both sides of the rear ends of the arms 26,27 act to urge the rear ends of the arms 26,27 toward each other. The arms 26,27 are provided at their rear ends with rollers 31,31 which engage with the tapered surfaces 28,28 of the actuator 23. A second pneumatic cylinder 33 is fixed horizontally to a bracket 32 which protrudes upright from the rear upper surface of the traverse 15. The second pneumatic cylinder 33 has a piston rod 34 projecting forwardly therefrom. The piston rod 34 is connected to the rear end of the actuator 23 by means of a pin 35. The arms 26,27 are provided at their ends with widened heads 26a,27a. As shown in detail in FIGS. 3 and 4, clamping plates 36,36 lined at their rear sides with rubber plates 37,37 are secured to the widened heads 26a, 27a of the arms 26,27. A plurality of V-shaped cutting edges 36a,36b,36c . . . are formed at a constant pitch in the opposing edges of respective clamping plates 36,36. The V-shaped cutting edges in both clamping plates cooperate with each other in defining a plurality of rectangular gaps of different sizes, when the opposing edges of the clamping plates 36,36 contact each other. Tipped edges 38,38 are formed on the ends of the rubber plates 37,37. A guide plate 39 is attached to the front surface of the upper clamping plate 36. The guide plate 39 has V-shaped guide notches 40 aligning with the cutting edges 36a,36b, 36c and so on. A pair of fingers 42,42 are supported at their base ends by a shaft 41 which is projected horizontally and forwardly from the upper front surface of the front wall 1a of the base 1. Guide bars 44,44 are protruded upwardly from a bracket 43 projected horizontally and forwardly from the front wall 1a. A liftable plate 45 is disposed for vertical movement along the guidebars 44,44, and is connected to the fingers 42,42 through links 47,47. A third pneumatic cylinder 48 fixed to the lower surface of the bracket 43 has a piston rod 49 projected upwardly therefrom and connected to the liftable plate 45. The fingers 42,42 are provided in their upper ends with V-shaped grippers 42a,42a opposing each other.

Figure 1:
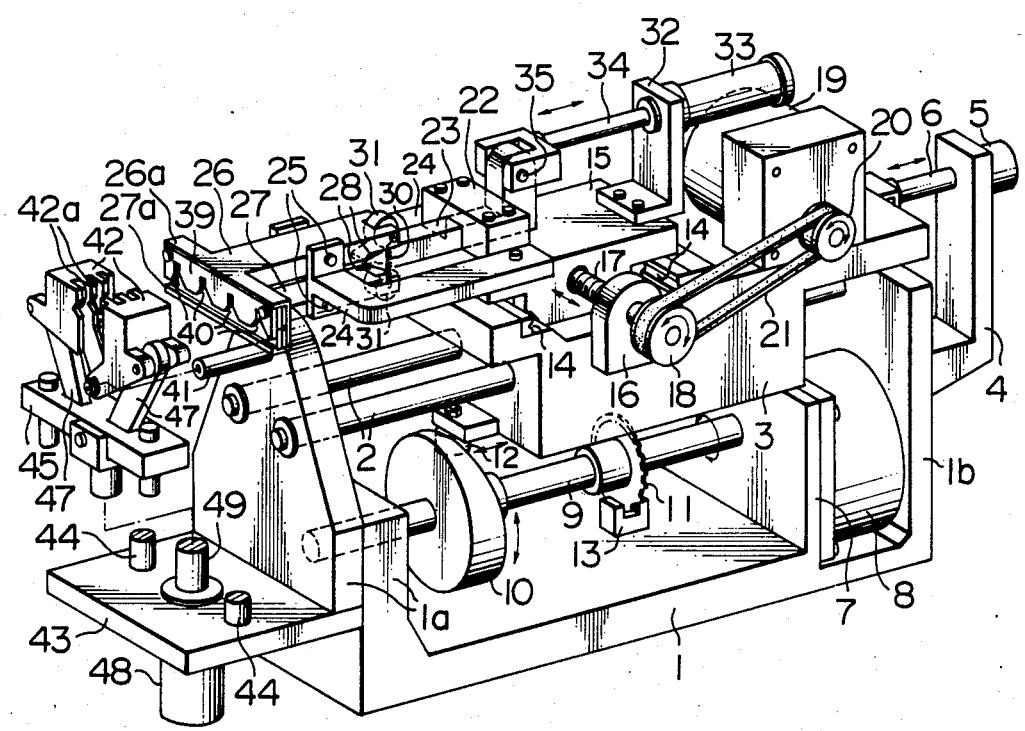
FIG. 1 is a partly cut-away perspective view of an embodiment of the stripping apparatus in accordance with the invention.
Figure 2:
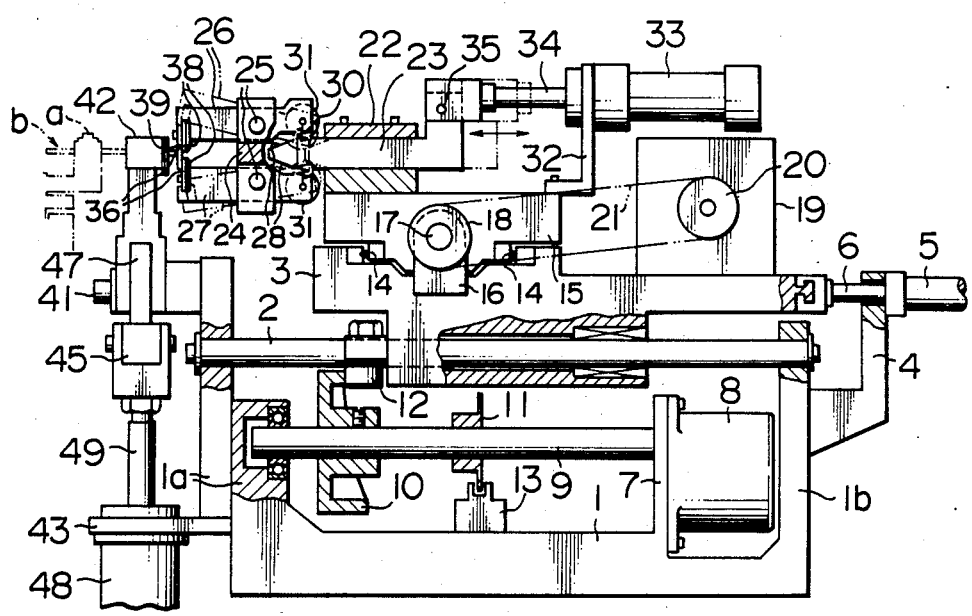
FIG. 2 is a partly cut-away side elevational view of the stripping apparatus shown in FIG. 1.

In operation, a coated electric wire b fixed at its base portion is fed by a clamp a, as shown in FIG. 2. The piston rod 49 of the third pneumatic cylinder 48 is extended to swing the fingers 42,42 toward each other so that the coated electric wire is firmly gripped by the grippers 42a,42a. The second pulse motor 19 operates to rotate the feed screw 17 thereby to drive the traverser 15 to the left and right so that one of the pairs of cutting edges 36a,36b,36c . . . , having the size conforming with the coated electric wire a is brought to the position of the wire b. At the same time, as shown by the chain line in FIG. 2, the piston rod 34 of the second pneumatic cylinder 33 is retracted to pull the actuator 23 rearwardly. Consequently, the arms 26,27 are swung in the opening direction by the force of the tension springs 30, thereby to move the clamping plates 36,36 away from each other. Subsequently, the piston rod 6 of the first pneumatic cylinder 5 is extended to drive the carriage 3 along the guide bar 2. When the roller 12 is contacted by the end surface cam 10, the second pneumatic cylinder 33 operates to extend its piston rod 34 as shown by the solid line and, through the engagement between the tapered end surfaces 28,28 of the actuator 23 and the rollers 31,31, the arms 26,27 are swung in the closing directions. While swinging in the closing direction, one of the guide notches 40 in the guide plate 39 fixed to the upper arm 26 guides the coated electric wire b into the cutting position defined by the selected one of the pairs of cutting edges 36a,36b,36c . . . in the clamping plates 36,36 as shown by the chain line in FIG. 4, and the coating d on the coated electric wire is partially cut by the cutting edges. Then, the piston rod 6 of the first pneumatic cylinder 5 is retracted to drive the carriage 3 and the clamping plates 36,36 rearwardly. Consequently, the end portion of the coating d is severed and removed from the core wire c. When the severed end portion of the coating d is completely separated from the end of the core wire c, the second pneumatic cylinder 33 operates to contract its piston rod thus swinging the arms in the opening direction, thereby causing the clamping plates 36,36 to move apart from each other. Before the clamping plates 36,36 are moved apart from each other, the severed piece of the coating d still sticks to the cutting edges 36a,36b,36c . . . , and is resiliently held by the tipped edges 38,38 of the rubber plates 37,37. However, as the clamping plates 36,36 are moved apart from each other, the rubber plates 37,37 tend to resume their original shape due to their resiliencies thus serving to forcibly separate the severed portion of the coating d from the cutting edges. As the clamping plates 36,36 are further swung away from each other, the severed portion of the coating d is released to fall by the force of gravity. Then, the third pneumatic cylinder 48 operates to extend its piston rod 49 to open the fingers 42,42, and the stripped electric wire b with its core wire c exposed is fed together with the clamp a to the next step of the process which is in this case twisting of wire by a twister.

Subsequently, for stripping the next coated electric wire d, the operation of the pulse motor 19 is controlled to move the clamping plates 36,36 together with the traverser 15 to the left and right thus bringing one of the pairs of cutting edges 36a,36b,36c . . . having the size corresponding to the diameter of the new wire d to be stripped into alignment with the fingers 42,42. Then, the same operation as described above is conducted to sever the end portion of the coating d and to strip the end portion of the coated electric wire b.

In the described embodiment, the exposed length of the core wire c can be varied as desired in the following way. Namely, to this end, the end surface cam 10 is rotated to a desired rotational position by the operation of the first pulse motor 8. The rotational position of the end surface cam 10 is sensed by the sensor 13 cooperating with the timing plate 11. As a result, the axial position of the roller 12 engaging with the end surface cam 10 is changed to vary the forward stroke end of the carriage 3. Consequently, the position of the cutting edges 36a,36b,36c . . . in the clamping plates 36,36 with respect to the coated electric wire b is varied thus changing the exposed length of the core wire c.

As has been described, the stripping apparatus of the invention has a pair of clamping plates provided with a plurality of pairs of cutting edges of different sizes formed in the opposing edges thereof. The clamping plates are movable laterally substantially at a right angle to the axis of the coated electric wire so that the cutting edges corresponding to the diameter of the coated electric wire to be stripped can be selected by the lateral shifting of the clamping plates, thus affording a large adaptability of the stripping apparatus to a wide variety of wire sizes. Using the stripping apparatus of the invention, therefore, it is possible to attain a high efficiency of large-lot and small-quantity production of stripped electric wires.

Although the invention has been described through specific terms, it is to be noted here that the described embodiment is not exclusive and various changes and modifications may be imparted thereto without departing from the scope of the invention which is limited solely by the appended claims.

What is claimed is:

1. A stripping apparatus for stripping coated electric wires comprising a pair of clamping plates having opposing contactable edges movable into and out of contact with each other and provided with cutting edges formed in said opposing contactable edges, the cutting edges in said clamping plates cooperating with each other in defining, when said clamping plates are held in contact with each other, cutting gaps of different sizes, said clamping plates being adapted to clamp and sever, at their cutting edges, an end portion of a coating on the coated electric wire at least partially, means for causing a relative movement between the coated electric wire and said clamping plates thereby to remove the severed end portion of the coating from a core wire of the coated electric wire, means for shifting said clamping plates in a direction substantially perpendicular to said coated electric wire to bring into a cutting position a selected one of said cutting gaps having a size corresponding to the diameter of the coated electric wire to be stripped, and a resilient plate affixed to one side of at least one of said clamping plates and overlying at least a portion of the cutting gaps when said clamping plates are in contact with each other, said resilient plate having sufficient resilience to deflect upon engagement with the coated electric wire when said clamping plates move into contact with each other and being returnable to its normal position when said clamping plates are moved away from each other for ejecting the severed coating end from the cutting gap.

2. A stripping apparatus according to claim 1, further comprising means for varying the position of said clamping plates along a length of the coated electric wire thus allowing an adjustment of the stripping length.

3. A stripping apparatus as set fourth in claim 1, further including gripping means movable between an opened position and a closed position for clamping a coated wire relative to the clamping plates, the means for causing relative movement between the coated electrical wire and the clamping plates comprising means for moving said clamping plates relative to said gripping means, said gripping means, in their gripping position, being fixed relative to the clamping plates in their direction of movement substantially perpendicular to the coated electrical wire.

4. A stripping apparatus as set fourth in claim 2, further including gripping means movable between an opened position and a closed position for clamping a coated wire relative to the clamping plates, the means for causing relative movement between the coated electrical wire and the clamping plates comprising means for moving said clamping plates relative to said gripping means, said gripping means, in their gripping position, being fixed relative the clamping plates in their direction of movement substantially perpendicular to the coated electrical wire.

5. A stripping apparatus for stripping coated electric wires comprising a pair of clamping plates having opposing contactable edges movable into and out of contact with each other and provided with at least one cutting edge formed in said opposing contactable edges, the cutting edges in said clamping plates cooperating with each other in defining, when said clamping plates are held in contact with each other, a cutting gap, said clamping plates being adapted to clamp and sever, at their cutting edges, an end portion of a coating on a coated electric wire at least partially, means for causing a relative movement between the coated electric wire and said clamping plates thereby to remove the severed end portion of the coating from a core wire of the coated electric wire, and a resilient plate affixed to the one of at least one of the clamping plates and overlying at least a portion of the cutting gap when said clamping plates are in contact with each other, said resilient plate having sufficient resilience to deflect upon engagement with the coated electric wire when said clamping plates move into contact with each other and being returnable to its noraml position when said clamping plates are moved away from each other for ejecting the severed coating end from the cutting gap.

6. A stripping apparatus according to claim 5 further comprising means for varying the position of said clamping along a length of the coated electric wire thus allowing an adjustment of the stripping length.

7. A stripping apparatus according to claim 6 further including gripping means movable between an opened position and a closed position for clamping a coated wire relative to the clamping plates, the means for causing relative movement between the coated electrical wire and the clamping plates comprising means for moving said clamping plates relative to said gripping means, said gripping means, in their gripping position, being fixed relative to the direction of movement of the clamping plates in a direction substantially perpendicular to the coated electrical wire.

* * * * *

UNITED STATES PATENT AND TRADEMARK OFFICE
CERTIFICATE OF CORRECTION

PATENT NO. : 4,614,135

DATED : September 30, 1986

INVENTOR(S) : Takeji Ito et al

It is certified that error appears in the above-identified patent and that said Letters Patent is hereby corrected as shown below:

Column 5, line 38, Claim 3, "fourth" should be --forth--.

Column 5, line 49, Claim 4, "fourth" should be --forth--.

Column 6, line 32, Claim 5, "noraml" should be --normal--.

Signed and Sealed this

Seventh Day of April, 1987

Attest:

DONALD J. QUIGG

Attesting Officer

Commissioner of Patents and Trademarks